Dec. 5, 1967    R. C. McGARRY    3,356,407
AUTOMOBILE CAMPERS
Filed Feb. 3, 1965    3 Sheets-Sheet 2

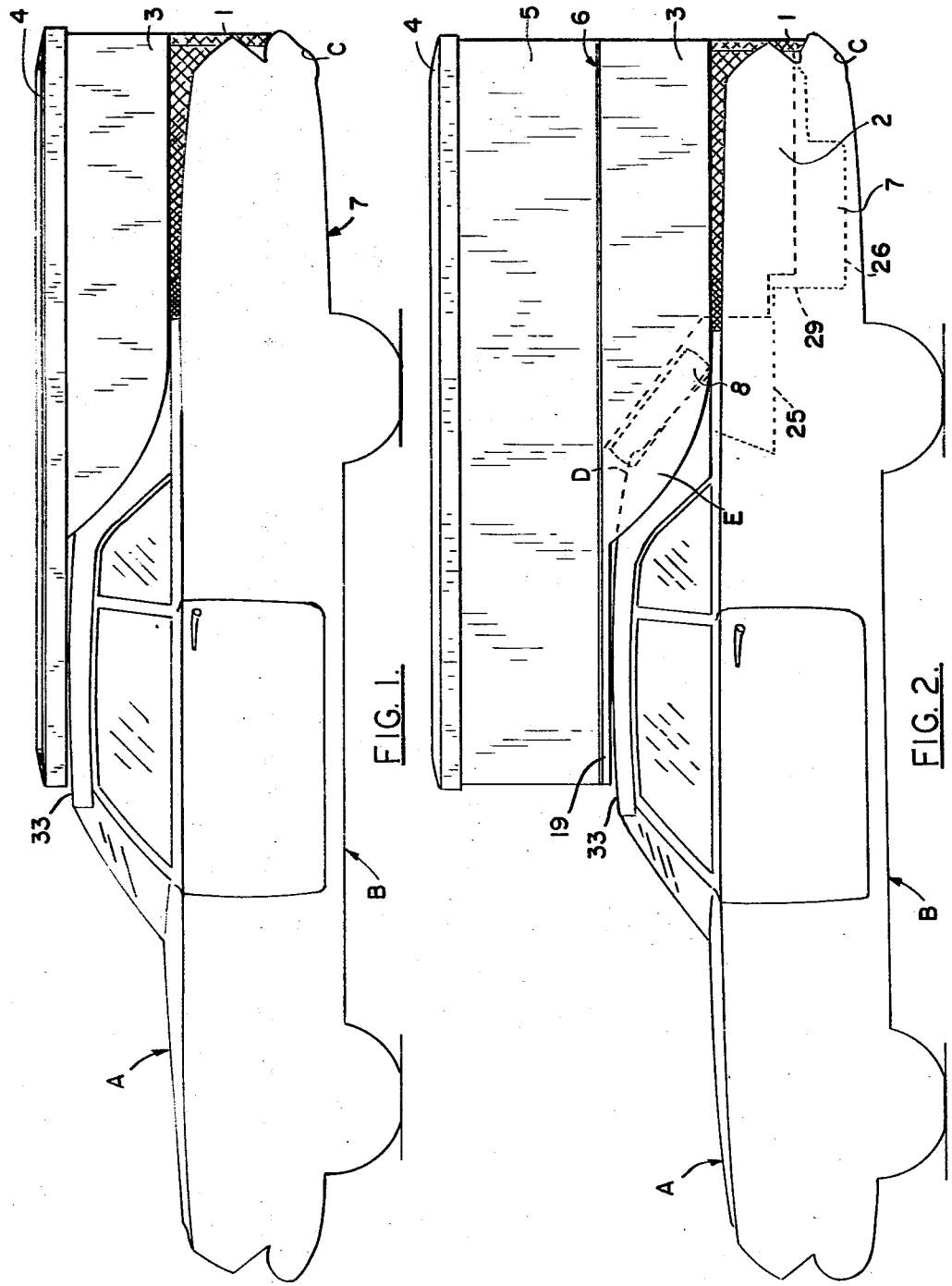

INVENTOR

Dec. 5, 1967   R. C. McGARRY   3,356,407
AUTOMOBILE CAMPERS
Filed Feb. 3, 1965   3 Sheets-Sheet 3
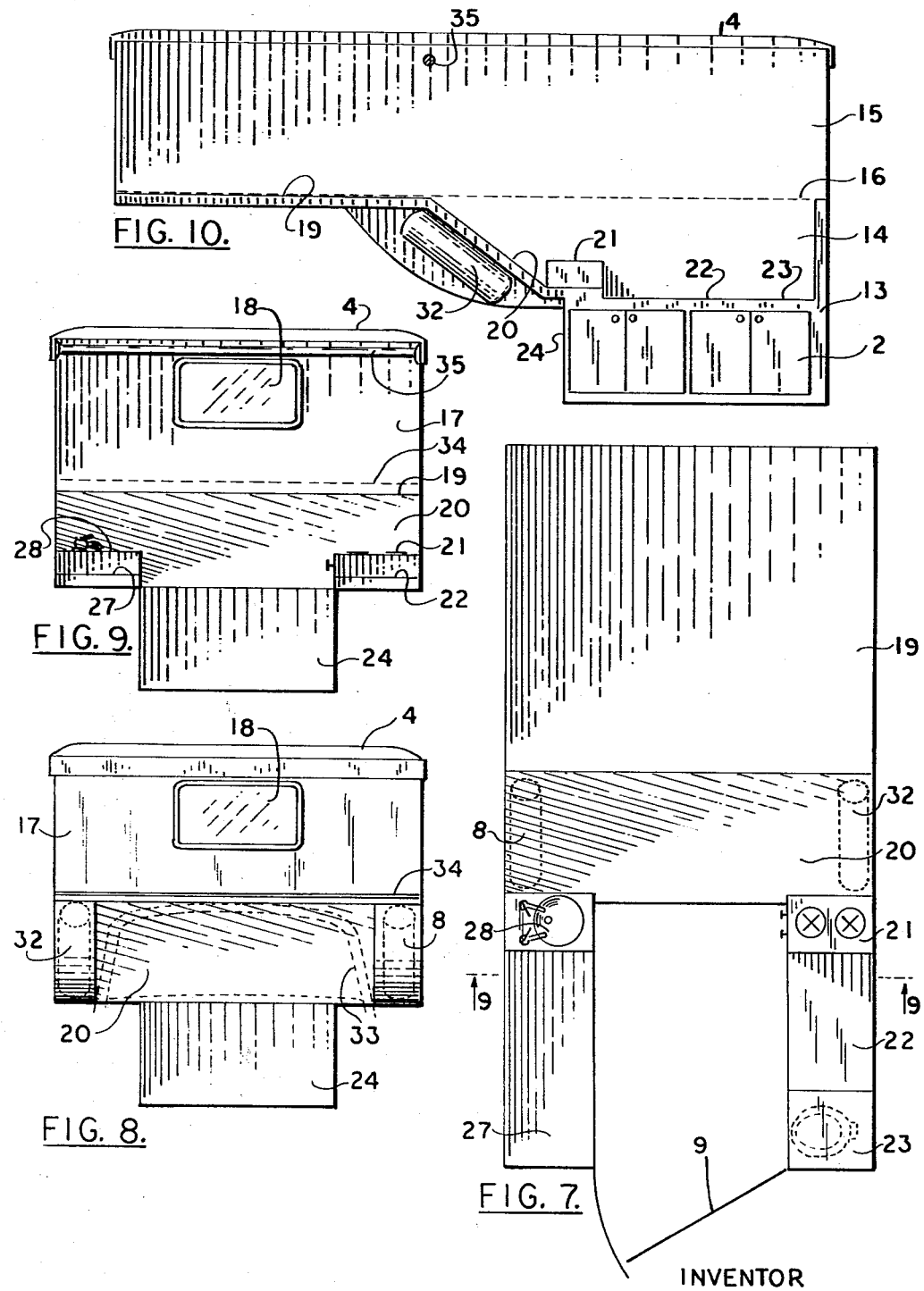
INVENTOR

# United States Patent Office 3,356,407
Patented Dec. 5, 1967

3,356,407
AUTOMOBILE CAMPERS
Russell C. McGarry, 895 E. 20th St.,
Merced, Calif. 95340
Filed Feb. 3, 1965, Ser. No. 430,222
1 Claim. (Cl. 296—23)

This invention relates in general to an improved automobile camper.

In particular, the invention is directed to an automobile camper designed to be installed on a sedan-type automobile having a body which provides a closed passenger carrying compartment, and a trunk rearwardly of such passenger compartment; the trunk, of course, having a floor, and a lid which may be removed preparatory to installation of the camper.

The major object of my invention is to provide a camper which is adapted to be readily and conveniently mounted on such an automobile upon removal of the trunk lid; the camper being arranged so that the floor area of the trunk becomes a living area for dining, etc., while a sleeping area is provided above and along the sedan top, and which sleeping area is in direct communication with the living area but may be easily curtained off therefrom when desired.

The camper—when in condition for occupancy—necessarily projects some distance above the top of the automobile, and another important object of my invention is to construct and arrange the upper portions of the camper so that they may be folded down when not in use whereby the camper then projects but a slight distance above said top of the automobile. Thus, when folded for travel, the camper produces a minimum of additional wind-resistance to affect proper operation of the automobile, and any possible top-heaviness thereof is avoided.

An additional object of the invention is to arrange and mount such foldable upper portions of the camper in a manner such that no removal nor readjustment of such portions is necessary when making a transition between an erected and a folded position thereof.

A further object of the invention is to provide an automobile camper which is designed for ease and economy of manufacture; the camper being relatively light in weight and consequently poses no problem when being mounted on or removed from the automobile.

A still further object of the invention is to provide a practical, reliable, and convenient automobile camper and one which is durable and exceedingly effective for the purpose for which it is designed.

These objects are accomplished by means of such structure and relative arrangement of parts as will fully appear by a perusal of the following specification and claim.

In the drawings:

FIG. 1 is a left side outline of a typical passenger automobile of the two-door sedan type, showing my improved camper mounted thereon and in its folded position for travel.

FIG. 2 is a similar view, but showing the camper as erected for use.

FIG. 7 is a plan view of the camper with the top removed.

FIG. 8 is a front elevation of the camper, detached from the automobile.

FIG. 9 is a somewhat diagrammatic cross section of the camper, taken on line 9—9 of FIG. 7.

FIG. 10 is a somewhat diagrammatic central longitudinal section of the camper, detached from the automobile.

Figure 4:
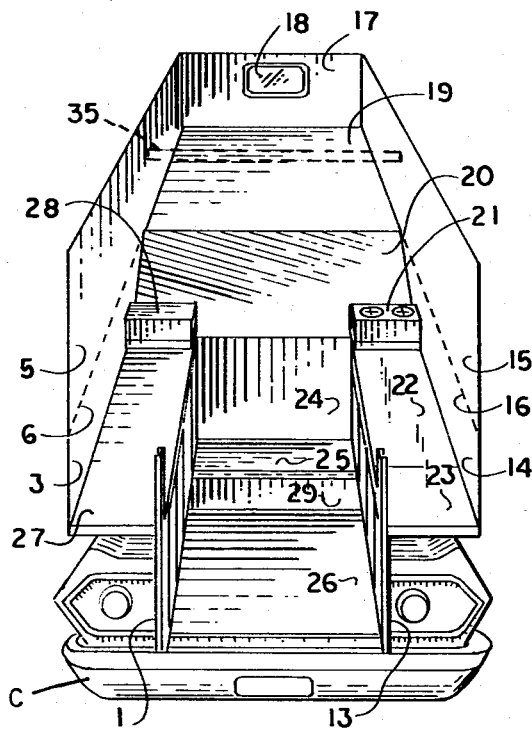
FIG. 4 is a similar view, but with the top and rear panels of the camper removed to show the interior arrangement of the camper.

Referring now more particularly to the drawings and to the characters of reference marked thereon, the automobile A—to which the camper is attached—is of a type which includes a passenger or driver's compartment B having a top 33, a trunk 7 rearwardly of the compartment B, and a transverse bumper C at the rear end of the trunk. The compartment B at its rear end terminates in a downwardly and rearwardly sloping portion as indicated at D in FIG. 2, and which terminates adjacent the forward end of the trunk opening. The trunk 7 has a flat bottom or floor 26 along its rear portion, a vertical panel 29 upstanding from the forward end of said floor 26, and a forward bottom portion 25 leading from the upper edge of said panel 29.

The camper, which is mounted on and secured to the car in any suitable manner, is constructed as follows:

At the rear end of the trunk 7, upstanding left and right supports 1 and 13, respectively, are disposed at the sides of the trunk opening, the lid or deck of which has been previously removed. The supports 1 and 13 extend down to the bumper C and are appropriately removably secured thereto.

The supports 1 and 13 comprise the basic frame of the camper, and include forwardly projecting panel portions which in effect line the sides on the trunk, and which at their forward ends are rigidly connected by a transverse bulkhead 24. Said panel portions are provided with doors 2 which give access to the spaces formed between said panel portions and the rear wheel fenders of the automobile.

Rigidly secured to the upper edges of said panel portions and extending along the same and laterally out therefrom are left and right seats 27 and 22, respectively; said seats being at a level slightly above the top of the trunk so as to clear the same. Secured to and extending along the outer edges of the seats and then forwardly therefrom are left and right lower panels 3 and 14, respectively. Such lower panels 3 and 14, along their lower edges forwardly of the seats, follow the contour of the body of the car ahead of the trunk 7 to and over the top 33 to a termination adjacent the forward end thereof as shown in FIG. 2.

The upper edges of the panels 3 and 14 are straight and horizontal from end to end, and a sleeping area floor 19 (resting in the main on the car top 33) is secured to said panels and extends from the forward ends thereof to a point some distance to the rear of such top; said panels 3 and 14 at their forward ends relatively closely lapping the body portion D at the sides thereof as shown at E in FIG. 2. The mid-portion of the camping attachment is thus located against lateral displacement on the automobile regardless of any securing means which may elsewhere be provided. An inclined panel 20, spanning between and secured to the panels 3 and 14, extends downwardly from the rear end of the sleeping area floor 19 to the upper edge of the bulkhead 24 in rearwardly spaced and substantially parallel relation to the body portion D. An enclosed space or compartment, separate from the living area of the camper and closed at the ends by panels 3 and 14, is thus provided between said inclined panel 20 and the body portion D of the automobile for the reception of a butane or similar fuel tank 32 as shown in FIG. 10, and a water tank 8 as shown in FIG. 2.

Rear panels 31 and 30 extends transversely from the rear ends of the panels 3 and 14, respectively, (and, of course, from the rear ends of the seats 27 and 22) to the related supports 1 and 13.

The foregoing described parts form the non-foldable unit of the camper, and to which certain foldable parts are added to provide the complete camper. Such parts include normally upstanding but downwardly and inwardly foldable left and right upper side panels 5 and 15, respectively, which extend the full length of the corresponding lower panels 3 and 14, and are connected thereto by continuous longitudinal left and right hinges 6 and 16, respectively. A transverse front panel 17, having a window 18 therein, extends between the panels 5 and 15 at the front end thereof, and is hingedly connected to the forward end of the floor 19, as at 34, for downward and rearward folding movement from a normal upstanding position. Upper rear panels, corresponding in width to the lower rear panels 30 and 31, normally upstand therefrom and are hingedly connected thereto, as at 12, for downward and forward folding movement from a normal upstanding position. All the panels 5, 15, 17, and the rear panels are rectangular in form and the same height so that, when said panels are upstanding, all their upper edges are on a common level and may be detachably engaged by a one-piece rigid flanged top or roof 4.

In order to prevent possible inward buckling of the relatively long panels 5 and 15 intermediate their ends, a combination brace or stiffener and curtain rod 35 extends between and is suitably detachably connected to said panels adjacent the top thereof and in a position directly above the rear end of the floor 19, as shown in FIG. 10. In this manner, not only are the panels braced, but the sleeping area defined by the floor 19 may be curtained off from the living area to the rear of and below said sleeping area.

Such living area contains a sink 28 on its left-hand side and at the forward end of the seat 27; the sink receiving its water from the tank 8. Additionally, the living area, on its right-hand side at the forward end of the seat 22, contains a butane cooking plate 21 to which fuel is fed from the butane tank 32. At the rear end of the seat 22, a cover 23—level with said seat—is provided over a water closet, as indicated in FIG. 7.

Figure 3:
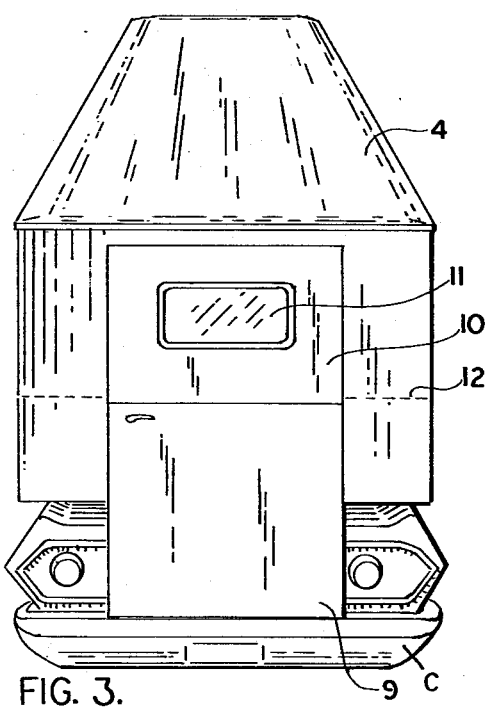
FIG. 3 is a rear-end perspective view of the automobile and camper thereon, and showing the latter in its erected position.
Figure 5:
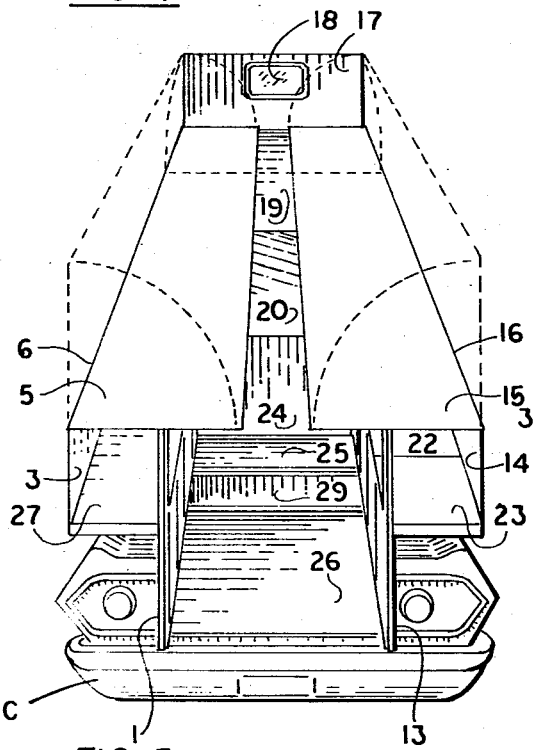
FIG. 5 is a similar view, but showing the camper as partially disassembled and partially folded.
Figure 6:
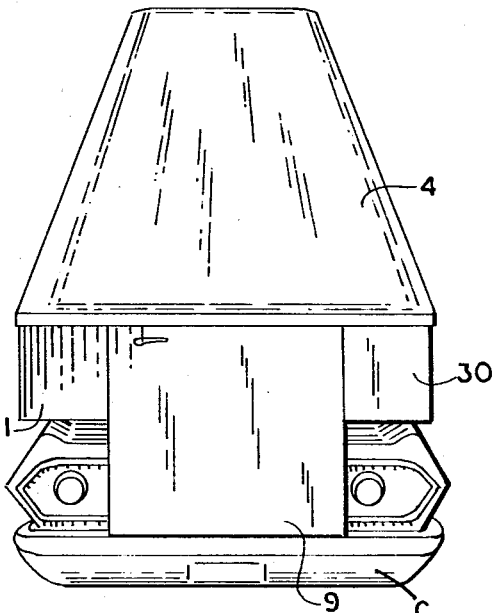
FIG. 6 is a rear-end perspective view of the automobile and camper thereon, showing the latter in its folded position.

The vertical space between the supports 1 and 13 at their rear ends, and from top to bottom of the erected camper, is closed by a door which comprises a lower section 9 which is hinged to the right-hand support 13 and extends upwardly to the level of the upper edges of the panels 30 and 31; and an upper section 10 which is suitably connected to section 9 for forward folding movement, and which when erected or unfolded, extends upwardly to adjacent the top 4, as indicated in FIG. 3. The upper door section 10 is provided with a window 11 therein.

With the foregoing described camper arrangement, it will be seen that when the foldable parts of the camper are erected, the occupants can cook meals, eat, sit at rest, or sleep at their pleasure, while protected from the elements and in entire privacy. At the same time, these different activities can be carried out without having to make any adjustment of any of the parts of the camper; the living area having ample head room for a person standing on the trunk floor 26.

When the camper is folded, with the top lowered, the camper projects only slightly above the actual top level of the automobile, as shown in FIG. 1, whereby but slight additional wind resistance is offered to the forward movement of the automobile and the latter is not at all top-heavy.

It will also be obvious that the change from an erected to a folded position, and vice versa, can be effected in a very short time, and with a minimum of physical exertion. Also, the camper as a whole may be easily and quickly mounted on or removed from the automobile.

From the foregoing description, it will be readily seen that there has been produced such an automobile camper as substantially fulfills the objects of the invention, as set forth herein.

While this specification sets forth in detail the present and preferred construction of the automobile camper, still in practice such deviations from such detail may be resorted to as do not form a departure from the spirit of the invention, as defined by the appended claim.

Having thus described the invention, the following is claimed as new and useful and upon which Letters Patent is desired:

In combination with a sedan-type motor vehicle having a rigid enclosed body portion provided with a lidless open trunk area at the rear of the body portion and the sides of which area are on a level below that of the body portion; a camping attachment comprising rear end longitudinal panel elements fitting into the trunk area adjacent the sides thereof and upstanding to a level above the top of the trunk and secured at their rear ends to the vehicle at its rear end, and longitudinal side panels rigid with said panel elements laterally out therefrom and at their forward ends lapping the sides of the body portion at the rear end thereof and in adjacent relation thereto, the rear transverse part of said body portion of the vehicle extending downwardly and rearwardly to the trunk area, a transverse panel extending between the side panels in spaced and substantially parallel relation to said downwardly and rearwardly extending rear transverse part of said body portion, said transverse panel forming an enclosed space with such transverse part and with the side panels, and separate fuel and water tanks mounted in said space.

References Cited

UNITED STATES PATENTS

| D. 192,795 | 5/1962 | Sloat | 296—23 |
| 3,143,121 | 8/1964 | McKee | 296—23 X |

FOREIGN PATENTS 80,139   10/1955   Denmark.

BENJAMIN HERSH, *Primary Examiner.*
P. GOODMAN, *Assistant Examiner.*